US010583519B2

(12) United States Patent
Litwinski

(10) Patent No.: US 10,583,519 B2
(45) Date of Patent: Mar. 10, 2020

(54) FRICTION STIR WELDING METHOD AND ASSEMBLY

(71) Applicant: The Boeing Company, Chicago, IL (US)

(72) Inventor: Richard A. Litwinski, Dana Point, CA (US)

(73) Assignee: The Boeing Company, Chicago, IL (US)

( * ) Notice: Subject to any disclaimer, the term of this patent is extended or adjusted under 35 U.S.C. 154(b) by 784 days.

(21) Appl. No.: 15/235,926

(22) Filed: Aug. 12, 2016

(65) Prior Publication Data

US 2018/0043464 A1    Feb. 15, 2018

(51) Int. Cl.
  *B23K 20/12*   (2006.01)
  *F16B 5/08*    (2006.01)
  *B23K 33/00*   (2006.01)
  *B23K 101/04*  (2006.01)

(52) U.S. Cl.
  CPC ........ *B23K 20/122* (2013.01); *B23K 20/1265* (2013.01); *B23K 33/004* (2013.01); *F16B 5/08* (2013.01); *B23K 2101/045* (2018.08)

(58) Field of Classification Search
  CPC .. B23K 20/122; B23K 20/12; B23K 20/1265; B23K 20/127; F16B 5/08; Y10T 403/477; Y10T 403/478
  See application file for complete search history.

(56) References Cited

U.S. PATENT DOCUMENTS 5,273,806 A    12/1993  Lockshaw et al.
5,616,376 A     4/1997  Lockshaw et al.
6,051,325 A *   4/2000  Talwar ............... B23K 20/1265
                                                    428/593
6,138,895 A    10/2000  Oelgoetz et al.
6,676,008 B1 *  1/2004  Trapp ................. B23K 20/1255
                                                    228/112.1

(Continued)

FOREIGN PATENT DOCUMENTS

JP    2001246482 A    9/2001
JP    2006007258 A    1/2006

OTHER PUBLICATIONS

European Search Report related to Application No. 17185237; report dated Mar. 2, 2018.

*Primary Examiner* — Jonathan P Masinick
(74) *Attorney, Agent, or Firm* — Miller, Matthias & Hull LLP

(57) ABSTRACT

A friction stir welded structure includes first and second members. The first member has a base defining opposed first and second surfaces, and spaced first and second walls extending outwardly from the second surface of the base to define a receptacle therebetween. The second member includes an elongate rib extending from a root portion to a first tip portion, the root portion having a uniform root portion thickness and the first tip portion having a first tip portion thickness not greater than the root portion thickness. The first tip portion is sized for insertion into the receptacle and shaped conformally with the receptacle so that the first tip portion engages a closed end of the receptacle. A friction stir weld joint extends through the base and at least portions of the first and second walls of the first member and into the first tip portion of the second member, thereby to join the first and second members.

20 Claims, 6 Drawing Sheets

(56) References Cited

U.S. PATENT DOCUMENTS

| | | | |
|---|---|---|---|
| 6,933,057 B2* | 8/2005 | Young | B23K 20/1265 |
| | | | 228/112.1 |
| 7,093,470 B2 | 8/2006 | El-Soudani | |
| 7,954,692 B2* | 6/2011 | Fukuda | B21J 5/063 |
| | | | 228/112.1 |
| 8,100,316 B2 | 1/2012 | Gross et al. | |
| 8,292,227 B2 | 10/2012 | Stuhr et al. | |
| 8,460,818 B2* | 6/2013 | Kim | H01M 2/206 |
| | | | 429/158 |
| 8,627,567 B2* | 1/2014 | Seo | B23K 20/1265 |
| | | | 29/890.03 |
| 10,086,587 B2* | 10/2018 | Lang | B32B 15/08 |
| 10,093,075 B2* | 10/2018 | Mochizuki | F28F 3/12 |
| 10,135,040 B2* | 11/2018 | Tsutsumi | H01M 2/06 |
| 2004/0065716 A1 | 4/2004 | Young et al. | |
| 2005/0247756 A1 | 11/2005 | Frazer et al. | |
| 2010/0001043 A1* | 1/2010 | Fukuda | B23K 20/126 |
| | | | 228/114.5 |
| 2010/0068550 A1 | 3/2010 | Watson et al. | |
| 2010/0089977 A1 | 4/2010 | Chen et al. | |
| 2011/0097142 A1* | 4/2011 | Bassler | B23K 11/0046 |
| | | | 403/337 |
| 2011/0180587 A1* | 7/2011 | Trapp | B23K 20/1225 |
| | | | 228/2.1 |
| 2014/0144015 A1* | 5/2014 | Mayer | H01R 4/187 |
| | | | 29/860 |
| 2018/0207745 A1* | 7/2018 | Hori | B23K 20/125 |
| 2018/0354064 A1* | 12/2018 | Fukuda | B23K 20/12 |

* cited by examiner

FRICTION STIR WELDING METHOD AND ASSEMBLY

TECHNICAL FIELD

The present disclosure generally relates to joining of structural components and, more specifically, to particularly friction stir welding methods and assemblies.

BACKGROUND

The advantages of welding together structural components, as opposed to other forms of connection such as bolting, are generally known. One type of welding process is known as friction stir welding (FSW). FSW is a solid-state joining process (i.e., the metal is not melted) that uses heat generated between a tool the components to be joined to soften and mechanically intermix portions of the component. The softened material is then joined using mechanical pressure, which may be applied by the tool. While FSW, as compared to other forms of welding, avoids problems associated with cooling material from the liquid phase, there is a general concern as to the sufficiency of the weld formed by FSW due to tunnel defects, discontinuities in the bond due to lack of forging, and incomplete penetration of the tool into the components.

SUMMARY

In accordance with one example, a method of joining first and second members together includes providing the first member with a base defining opposed first and second surfaces, and spaced first and second walls extending outwardly from the second surface of the base to define a receptacle therebetween. The second member is provided as an elongate rib extending from a root portion to a first tip portion, the root portion having a uniform root portion thickness and the first tip portion having a first tip portion thickness not greater than the root portion thickness, the first tip portion being sized for insertion into the receptacle and shaped conformally with the receptacle. The first and second members are positioned so that the first tip portion of the second member is inserted into the receptacle of the first member with the tip portion engaging a closed end of the receptacle. The first tip portion and first and second walls are friction stir welded to form a welded joint between the first and second members.

In accordance with another example, a structure includes a first member having a base defining opposed first and second surfaces, and spaced first and second walls extending outwardly from the second surface of the base to define a receptacle therebetween. A second member includes an elongate rib extending from a root portion to a first tip portion, the root portion having a uniform root portion thickness and the first tip portion having a first tip portion thickness not greater than the root portion thickness, the first tip portion being sized for insertion into the receptacle and shaped conformally with the receptacle so that the first tip portion engages a closed end of the receptacle. A friction stir weld joint extends through the base and at least portions of the first and second walls of the first member and into the tip portion of the second member.

In accordance with yet another example, a structure includes a first member having a base defining an interior surface, and spaced first and second walls extending outwardly from the base interior surface to define a first receptacle. A second member includes an elongate rib having a root portion and first and second tip portions, the root portion having a uniform root portion thickness and each of the first and second tip portions having a tip portion thickness not greater than the root portion thickness. A third member has a base defining an interior surface, and spaced first and second walls extending outwardly from the base interior surface to define a second receptacle. The first tip portion is sized for insertion into the first receptacle and shaped conformally with the first receptacle so that the first tip portion engages a closed end of the first receptacle. Similarly, the second tip portion is sized for insertion into the second receptacle and shaped conformally with the second receptacle so that the second tip portion engages a closed end of the second receptacle. A first friction stir weld joint extends through the base and at least portions of the first and second walls of the first member and into the first tip portion of the second member, and a second friction stir weld joint extends through the base and at least portions of the first and second walls of the third member and into the second tip portion of the second member.

These and other aspects and features will become more readily apparent upon reading the following detailed description when taken in conjunction with the accompanying drawings. In addition, although various features are disclosed in relation to specific examples, it is understood that the various features may be combined with each other, or used alone, with any of the various examples without departing from the scope of the disclosure.

It should be understood that the drawings are not necessarily drawn to scale and that the disclosed embodiments are sometimes illustrated schematically. It is to be further appreciated that the following detailed description is merely exemplary in nature and is not intended to limit the disclosure or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
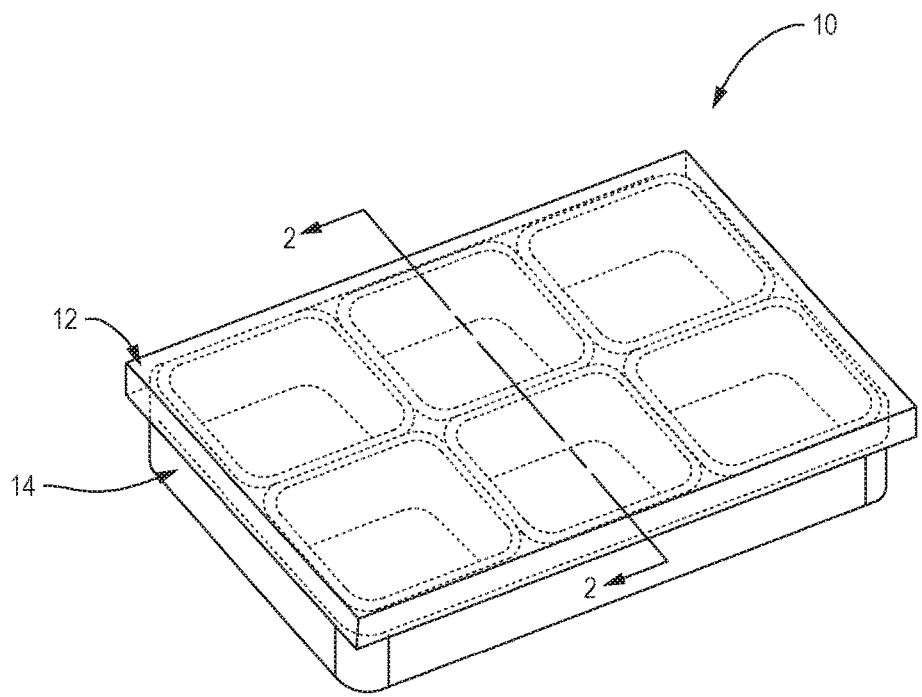
FIG. 1 is a perspective view of a structure in the form of an enclosure constructed according to the present disclosure.

FIG. 1 illustrates a structure 10 that includes structural components in the form of first and second members 12, 14 that are joined together using FSW. The exemplary structure 10 is illustrated in FIG. 1 as an enclosure in which the first member 12 is an enclosure cover and the second member 14 is an enclosure bottom, and the enclosure cover is welded to the enclosure bottom. The structure 10 is shown as an enclosure only as an example, as it will be appreciated that the structure 10 may be provided in other forms and for other purposes.

Figure 2:
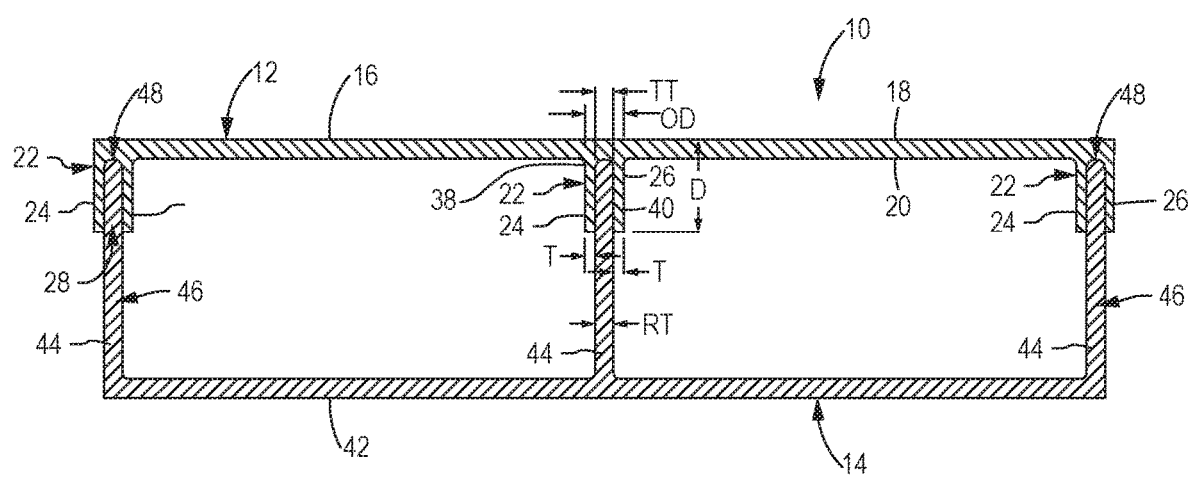
FIG. 2 is a side elevation view, in cross-section, of the structure taken along line 2-2 of FIG. 1.
Figure 3:
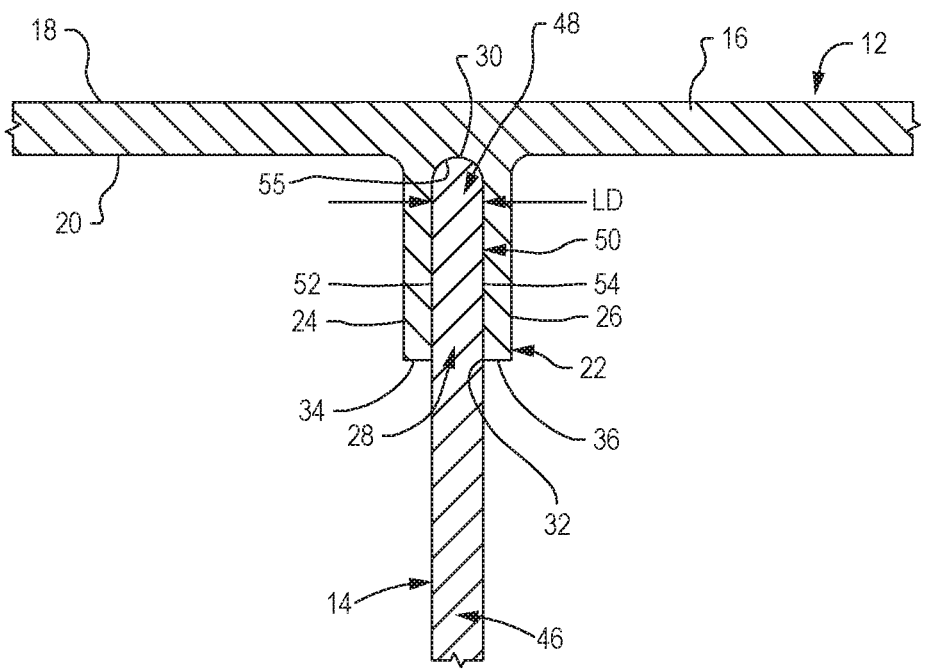
FIG. 3 is an enlarged detail of the side elevation view of FIG. 2.

As best shown in FIGS. 2 and 3, the first member 12 includes a base 16 that is substantially planar and defines opposed first and second surfaces 18, 20. While the base 16 of this embodiment is planar, it will be appreciated that the base 16 may be provided with a non-planar configuration. The first member 12 further includes wall sets 22, with each wall set including spaced first and second walls 24, 26 extending outwardly from the second surface 20 of the base 16. Each set of first and second walls 24, 26 defines a receptacle 28 therebetween, with the receptacle 28 including a closed end 30 and an open end 32. In the illustrated embodiment, the closed end 30 of the receptacle 28 is substantially aligned with the second surface 20 of the base 16, however the closed end 30 may be disposed at other elevations relative to the second surface 20.

In the illustrated embodiment, each of the first and second walls has a uniform wall thickness T. The first and second walls 24, 26 are shown as being parallel to each other and extending substantially perpendicular from the base 16. It will be appreciated, however, that the first and second walls 24, 26 may be non-parallel and may extend from the base 16 at angles other than 90 degrees. The first wall 24 includes a distal end 34 and the second wall includes a distal end 36. The distal ends 34, 36 may be disposed at substantially the same end distance D (FIG. 2) from the first surface 18 of the base 16. Additionally, the first wall 24 has a wall exterior surface 38 and the second wall 26 has a wall exterior surface 40. The wall exterior surfaces 38, 40 are spaced by an outer wall distance OD.

With continue reference to FIGS. 2 and 3, the second member 14 includes a bottom wall 42 and a plurality of elongate ribs 44 extending outwardly from the bottom wall 42. Each rib 44 includes a root portion 46 and a first tip portion 48. The root portion 46 has a uniform root portion thickness RT and the first tip portion 48 has a first tip portion thickness TT that is not greater than the root portion thickness RT. The first tip portion 48 is sized for insertion into, and is shaped conformally with, the receptacle 28 so that the first tip portion 48 engages the closed end 30 of the receptacle 28. In the illustrated embodiment, the first tip portion 48 has a radiused cross-sectional profile.

As best shown in FIG. 3, the first tip portion 48 of the second member 14 may be inserted into the receptacle 28 of the first member 12. When the first and second members 12, 14 are assembled in this manner, an interface region 50 is formed between the first and second members 12, 14. The interface region 50 is defined herein as the region where surfaces of the first and second members 12, 14 conform to one another. The interface region 50 includes first and second longitudinal legs 52, 54 spaced by a lateral distance LD, with a lateral intermediate portion 55 extending between the first and second longitudinal legs 52, 54. To facilitate a stronger weld, as explained below, each of the first and second longitudinal legs 52, 54 has a length LL that is greater than the lateral distance LD. To further improve the weld, the wall thickness T of the first and second walls 24, 26 may be approximately ½ of a root portion thickness RT.

Figure 4:
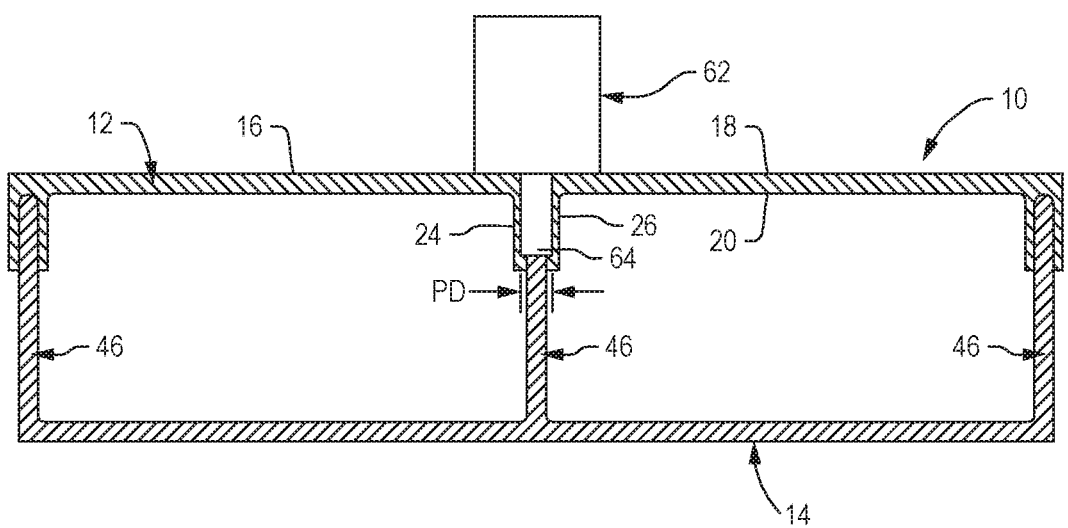
FIG. 4 is a side elevation view, in cross-section, of the structure of FIG. 1 with a friction stir welding tool performing a friction stir weld.
Figure 5:
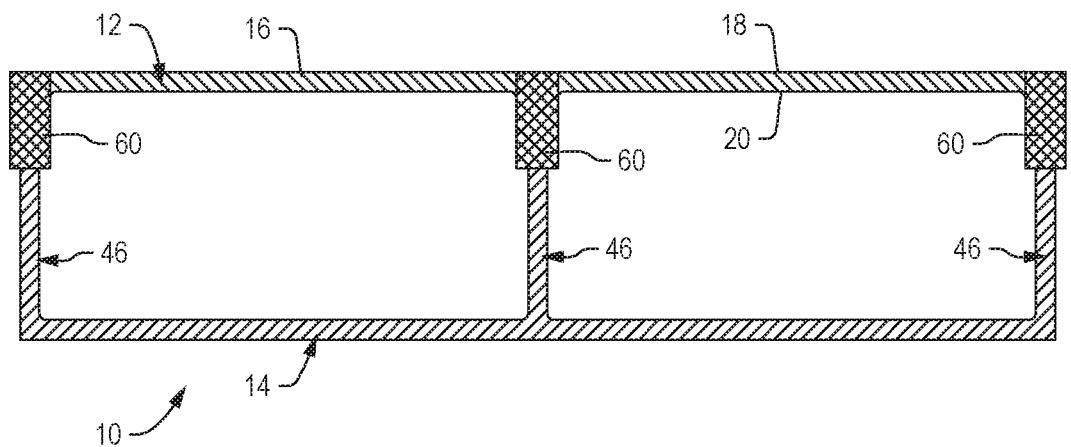
FIG. 5 is a side elevation view, in cross-section, of the structure of FIG. 1 after friction stir welding.

Referring to FIGS. 4 and 5, the first and second members 12, 14 may be joined by one or more friction stir weld joints 60. The friction stir weld joint 60 may be formed by a friction stir welding tool 62 having a pin 64. During the friction stir welding process, the pin 64 of the tool 62 is rotated and forced through the first member 12 and into a portion of the second member 14. Heat and pressure generated by the tool 62 mechanically intermixes portions of the first and second members 12, 14 to form the friction stir weld joint 60. In the illustrated embodiment, the friction stir weld joint 60 extends through the base 16 and at least portions of the first and second walls 24, 26 of the first member 12 and into the first tip portion 48 of the second member 14. By providing a tongue-and-groove type interface region 50, the resulting friction stir weld joint 60 has a stronger weld that relocates any discontinuities in the weld to be out of the plane that would normally be formed in a lap joint type of weld.

Figure 6:
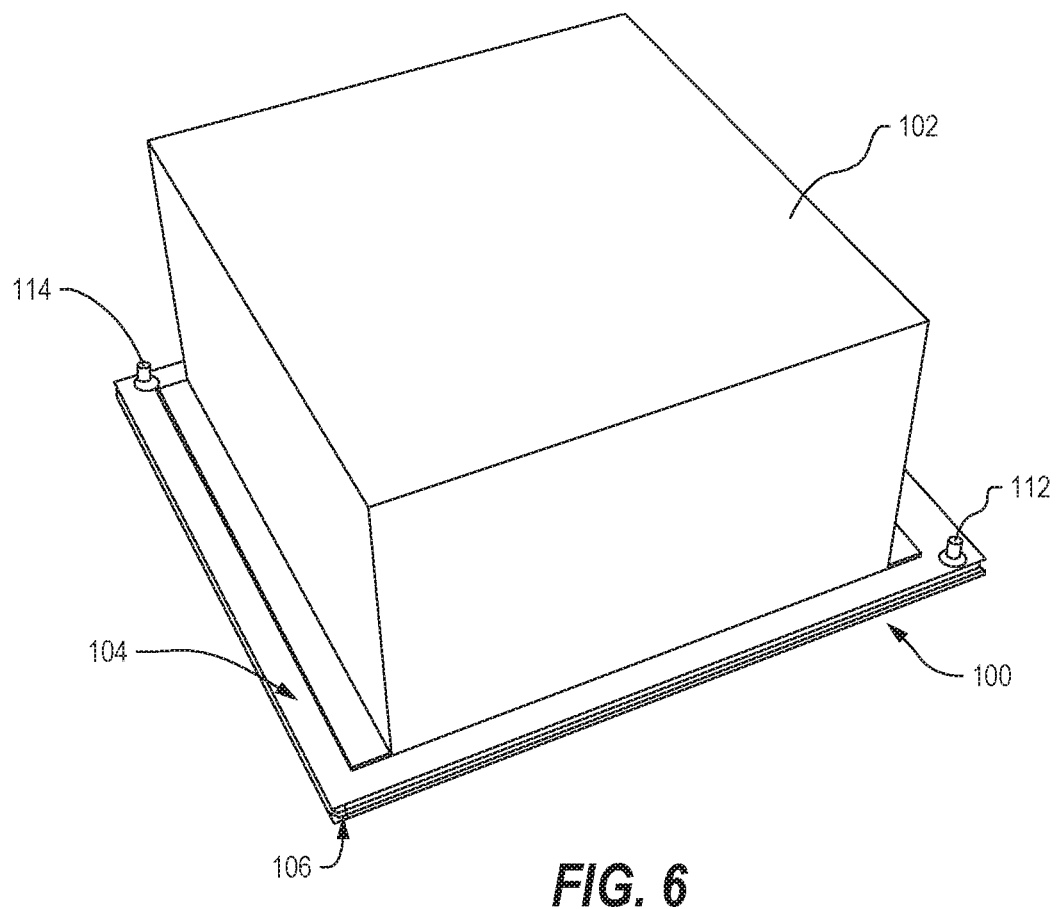
FIG. 6 is a perspective view of an alternative example of a structure in the form of a coldplate, constructed according to the present disclosure.
Figure 7:
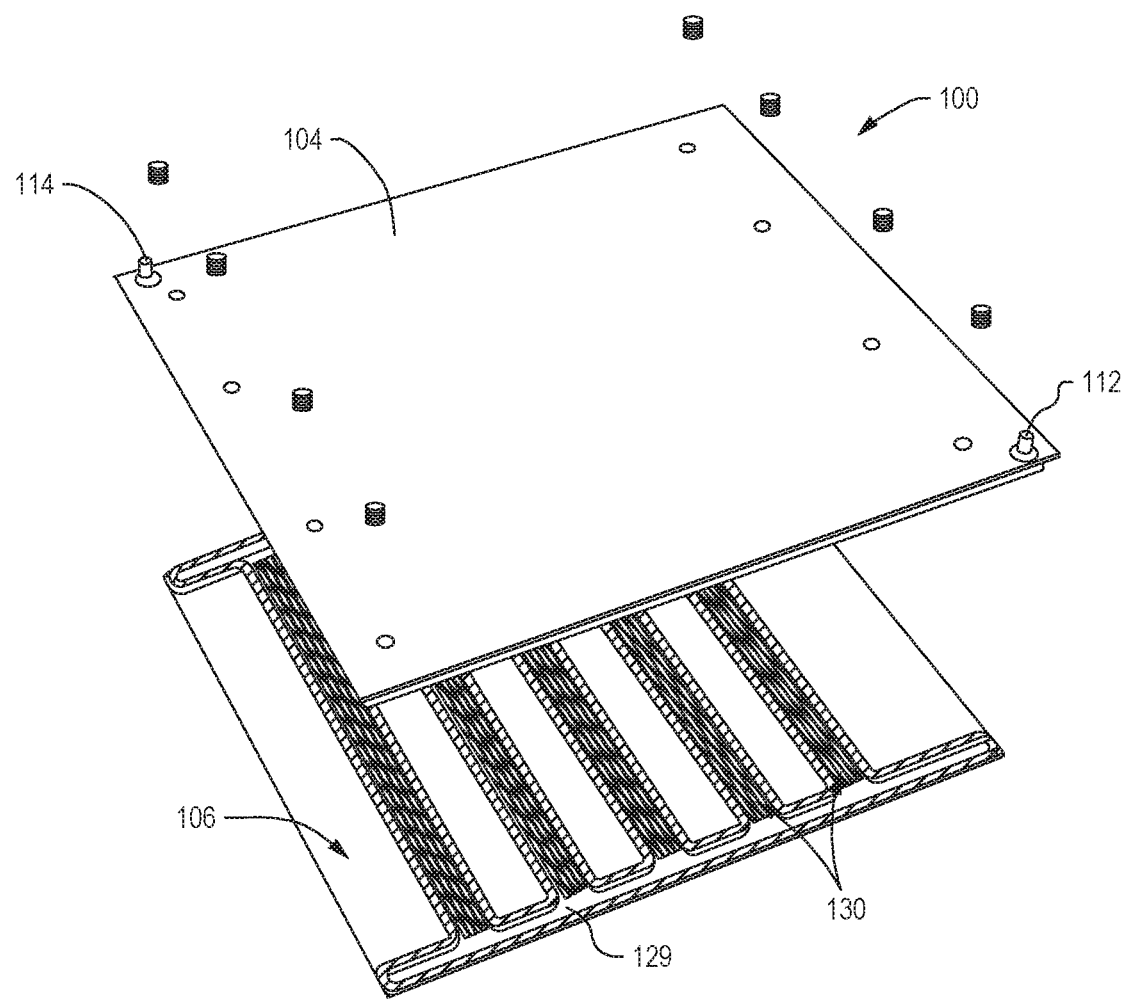
FIG. 7 is an exploded view of the coldplate of FIG. 6.
Figure 8:
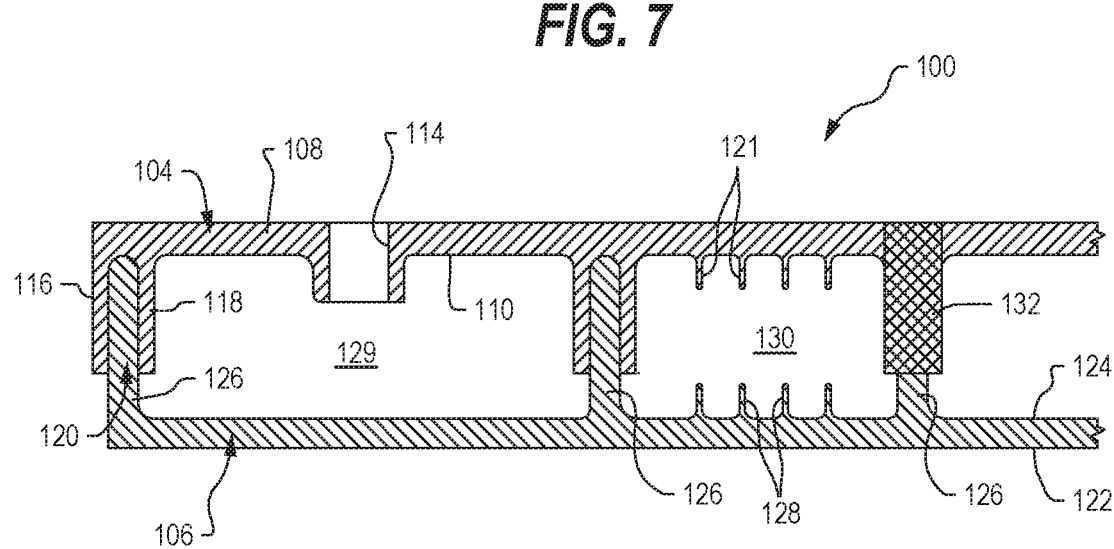
FIG. 8 is a side elevation view, in cross-section, of the coldplate of FIG. 6.

FIGS. 6-8 illustrate an alternative embodiment of a structure 100 provided in the form of coldplate for cooling a heat source, such as an avionics box 102. The structure 100 is constructed of a first member 104 in the form of a cover assembly and a second member 106 in the form of a base assembly. The first member 104 includes a base 108 having an interior surface 110 and defining a fluid inlet 112 and a fluid outlet 114. Sets of first and second walls 116, 118 depend from the interior surface 110 and define a receptacle 120 therebetween. Cooling fins 121 may also depend from the interior surface 110.

The second member 106 includes a base bottom 122 having an interior surface 124. Ribs 126 and cooling fins 128 extend upwardly from the interior surface 124. The ribs 126 are sized for insertion into the receptacles 120 of the first member 104 to define a plenum 129 and pathways 130 between the fluid inlet 112 and the fluid outlet 114. Each rib 126 and an associated set of first and second walls 116, 118 are friction stir welded to obtain a welded joint 132.

Figure 9:
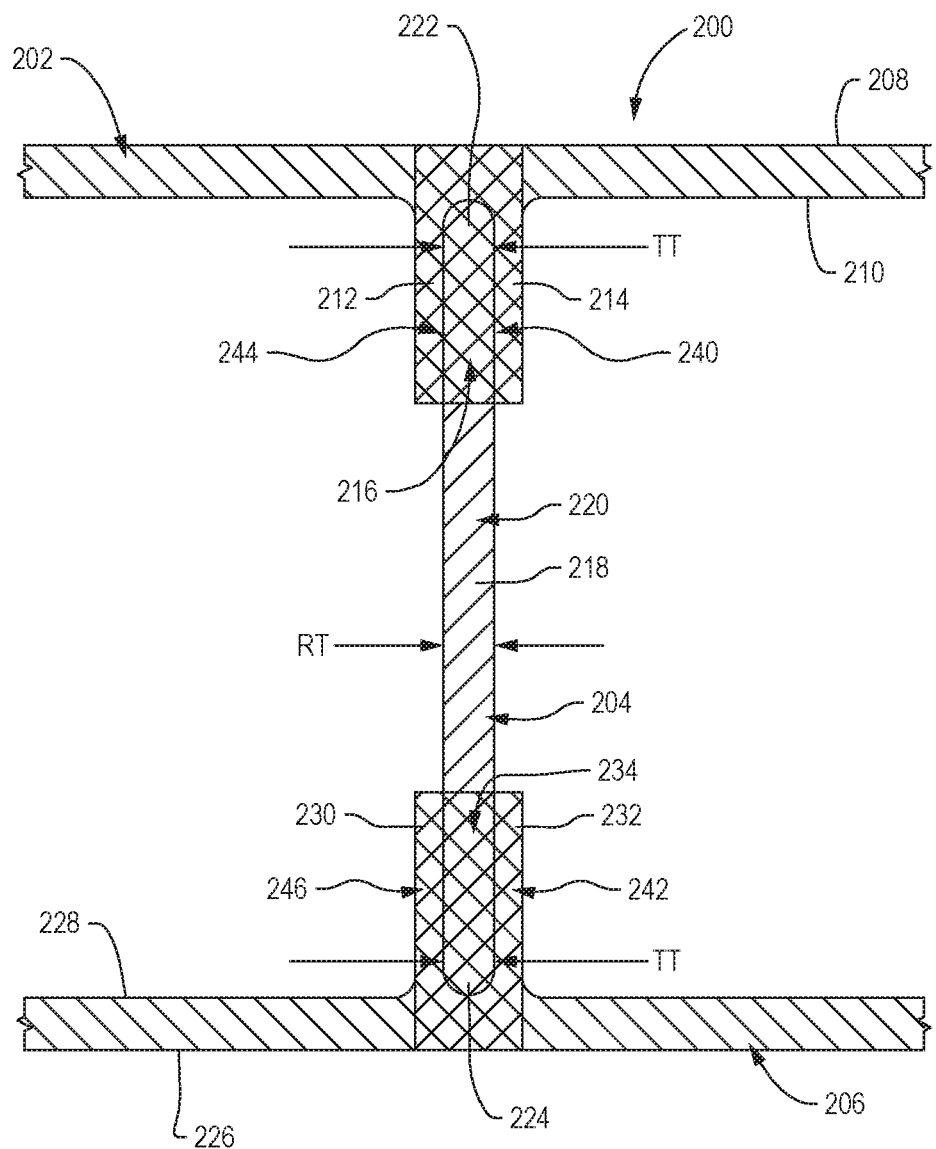
FIG. 9 is a side elevation view, in cross-section, of another example of a structure having three components, constructed according to the present disclosure.

FIG. 9 illustrates a further embodiment of a structure 200 having three structural components. More specifically, the structure 200 includes a first member 202, a second member 204, and a third member 206. The first member 202 has a base 208 defining an interior surface 210, and spaced first and second walls 212, 214 extending outwardly from the base interior surface 210 to define a first receptacle 216. The second member 204 includes an elongate rib 218 having a root portion 220 and first and second tip portions 222, 224. The root portion 220 has a uniform root portion thickness RT and each of the first and second tip portions 222, 224 having a tip portion thickness TT not greater than the root portion thickness RT. The third member 206 has a base 226 defining an interior surface 228, and spaced first and second walls 230, 232 extending outwardly from the base interior surface 228 to define a second receptacle 234.

The first, second, and third members 202, 204, 206 may be assembled to form the structure 200. For example, the first tip portion 222 is sized for insertion into, and shaped conformally with, the first receptacle 216 so that the first tip portion 222 engages a closed end 236 of the first receptacle 216. Similarly, the second tip portion 224 is sized for insertion into, and shaped conformally with, the second receptacle 234 so that the second tip portion 224 engages a closed end 238 of the second receptacle 234. When assembled as shown, a first interface region 240 is formed between the first and second members 202, 204 and a second interface region 242 is formed between the second and third members 204, 206. Each of the first and second interface regions 240, 242 includes first and second longitudinal legs spaced by a lateral distance and having lengths greater than the lateral distance, as best shown in FIG. 3 described in greater detail above.

The first, second, and third members 202, 204, 206 are friction stir welded together to complete the structure 200. For example, a first friction stir weld joint 244 extends through the base 208 and at least portions of the first and second walls 212, 214 of the first member 202 and into the first tip portion 222 of the second member 204. A second friction stir weld joint 246 extends through the base 226 and at least portions of the first and second walls 230, 232 of the third member 206 and into the second tip portion 224 of the second member 204.

Figure 10:
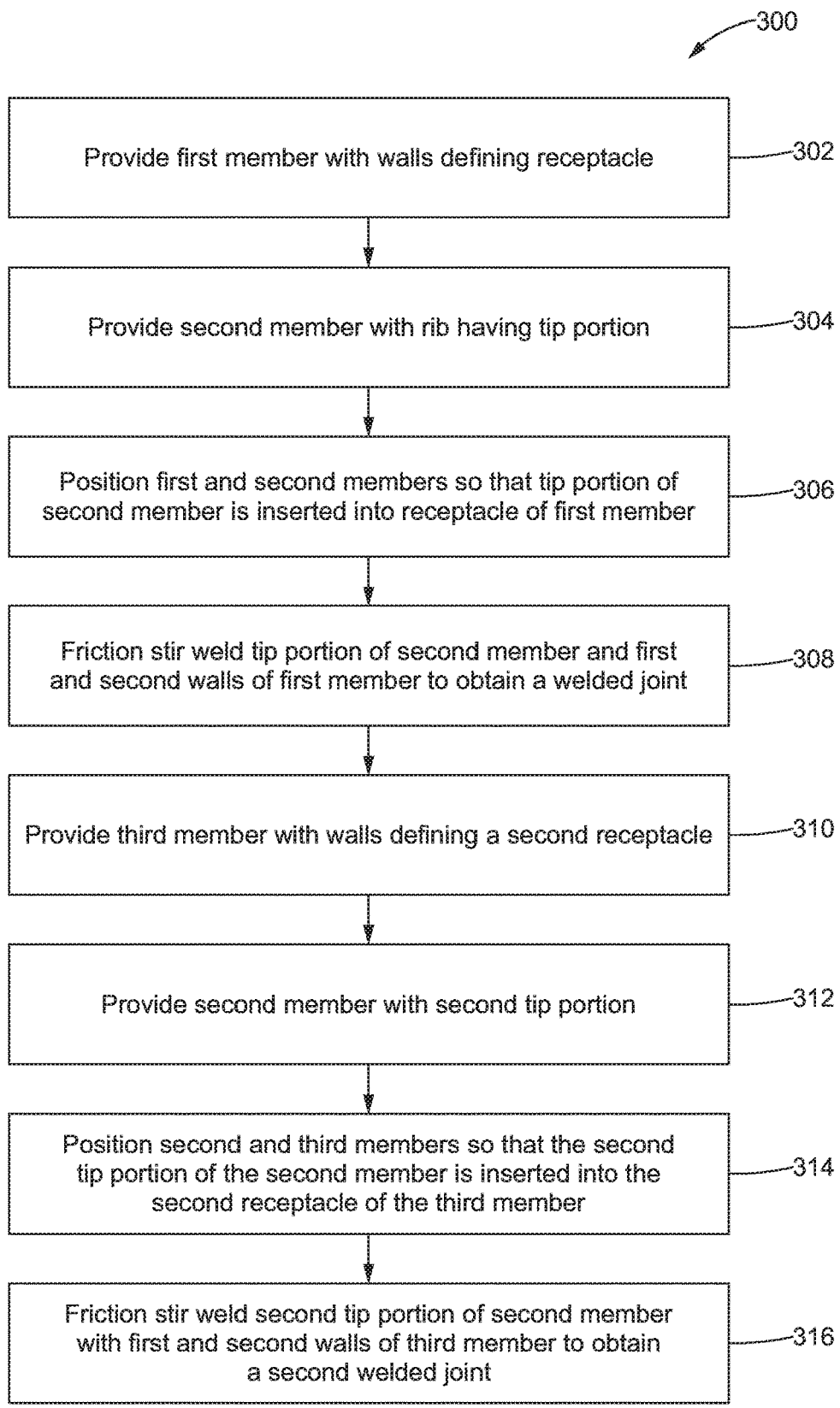
FIG. 10 is a schematic flowchart illustrating a method of joining first and second members, according to the present disclosure.

FIG. 10 schematically illustrates a method 300 of joining together at least two structural components, according to additional embodiments of the present disclosure. The method begins at block 302 by providing the first member with a base having opposed first and second surfaces and spaced first and second walls extending outwardly from the second surface of the base to define a receptacle therebetween. Next, at block 304, the second member is provided with an elongate rib extending from a root portion to a first tip portion. The root portion may have a uniform root portion thickness RT and the first tip portion having a first tip portion thickness TT not greater than the root portion thickness RT, with the first tip portion sized for insertion into, and shaped conformally with, the receptacle.

Continuing at block 306, the first and second members are positioned so that the first tip portion of the second member is inserted into the receptacle of the first member. In this configuration, the first tip portion may engage a closed end of the receptacle. At block 308, the first tip portion and first and second walls are friction stir welded to form a welded joint between the first and second members.

In some embodiments, each of the first and second walls includes a distal end disposed at an end distance from the first surface of the base, and the friction stir welding is performed by inserting a pin of a friction stir welding tool through the base of the first member and into the second member to a pin depth that is not greater than the end distance. In additional embodiments, the pin of the friction stir welding tool has a pin diameter PD (FIG. 4) that is greater than the root portion thickness of the second member. In further embodiments, each of the first and second walls has a wall exterior surface, the wall exterior surfaces are spaced by an outer wall distance, and the pin diameter of the friction stir welding tool is less than the outer wall distance.

Optionally, the method 300 may continue by joining a third component of the structure. At block 310, for example, a third member is provided with a base defining opposed first and second surfaces, and spaced first and second walls extending outwardly from the second surface of the base to define a second receptacle therebetween. At block 312, the second member is provided with a second tip portion opposite the first tip portion. The second tip portion may have a second tip portion thickness not greater than the root portion thickness of the second member, and is sized for insertion into, and shaped conformally with, the second receptacle. At block 314, the second and third members are positioned so that the second tip portion of the second member is inserted into the second receptacle of the third member with the second tip portion engaging the closed end of the second receptacle. At block 316, the second tip portion and the first and second walls of the third member are friction stir welded to form a second welded joint between the second and third members.

All references, including publications, patent applications, and patents, cited herein are hereby incorporated by reference. All methods described herein can be performed in any suitable order unless otherwise indicated herein or otherwise clearly contradicted by context. The use of any and all examples, or exemplary language (e.g., "such as") provided herein, is intended to illuminate the disclosed subject matter and does not pose a limitation on the scope of the claims. Any statement herein as to the nature or benefits of the exemplary embodiments is not intended to be limiting, and the appended claims should not be deemed to be limited by such statements. More generally, no language in the specification should be construed as indicating any non-claimed element as being essential to the practice of the claimed subject matter. The scope of the claims includes all modifications and equivalents of the subject matter recited therein as permitted by applicable law. Moreover, any combination of the above-described elements in all possible variations thereof is encompassed by the claims unless otherwise indicated herein or otherwise clearly contradicted by context. Additionally, aspects of the different embodiments can be combined with or substituted for one another. Finally, the description herein of any reference or patent, even if identified as "prior," is not intended to constitute a concession that such reference or patent is available as prior art against the present disclosure.

What is claimed is:

1. A method of joining first and second members together, the method comprising:
   providing the first member with a base defining opposed first and second surfaces, and spaced first and second walls extending outwardly from the second surface of the base to define a receptacle therebetween;
   providing the second member as an elongate rib extending from a root portion to a first tip portion, the root portion having a uniform root portion thickness and the first tip portion having a first tip portion thickness not greater than the root portion thickness, the first tip portion being sized for insertion into the receptacle and shaped conformally with the receptacle;
   positioning the first and second members so that the first tip portion of the second member is inserted into the receptacle of the first member with the first tip portion engaging a closed end of the receptacle; and
   friction stir welding the first tip portion and first and second walls to form a welded joint between the first and second members;
   wherein each of the first and second walls of the first member has a uniform wall thickness that is approximately half of the root portion thickness of the second member.

2. The method of claim 1, in which the first tip portion has a radiused cross-sectional profile.

3. The method of claim 1, in which the closed end of the receptacle is substantially aligned with the second surface of the base.

4. The method of claim 1, in which:
   each of the first and second walls includes a distal end disposed at an end distance from the first surface of the base, and
   the friction stir welding is performed by inserting a pin of a friction stir welding tool through the base of the first member and into the second member to a pin depth that is not greater than the end distance.

5. The method of claim 4, in which the pin of the friction stir welding tool has a pin diameter that is greater than the root portion thickness of the second member.

6. The method of claim 5, in which each of the first and second walls has a wall exterior surface, the wall exterior surfaces are spaced by an outer wall distance, and the pin diameter is less than the outer wall distance.

7. The method of claim 1, in which an interface region is formed between the first and second members, the interface region including first and second longitudinal legs spaced by a lateral distance, and in which each of the first and second longitudinal legs has a length that is greater than the lateral distance.

8. The method of claim 1, further comprising:
providing a third member with a base defining opposed first and second surfaces, and spaced first and second walls extending outwardly from the second surface of the base to define a second receptacle therebetween;
further providing the second member with a second tip portion opposite the first tip portion, and the second tip portion having a second tip portion thickness not greater than the root portion thickness of the second member, the second tip portion being sized for insertion into the second receptacle and shaped conformally with the second receptacle;
positioning the second and third members so that the second tip portion of the second member is inserted into the second receptacle of the third member with the second tip portion engaging the closed end of the second receptacle; and
friction stir welding the second tip portion and the first and second walls of the third member to form a second welded joint between the second and third members.

9. A structure comprising:
a first member having a base defining opposed first and second surfaces, and spaced first and second walls extending outwardly from the second surface of the base to define a receptacle therebetween;
a second member including an elongate rib extending from a root portion to a first tip portion, the root portion having a uniform root portion thickness and the first tip portion having a first tip portion thickness not greater than the root portion thickness, the first tip portion being sized for insertion into the receptacle and shaped conformally with the receptacle so that the first tip portion engages a closed end of the receptacle; and
a friction stir weld joint that extends through the base and at least portions of the first and second walls of the first member and into the first tip portion of the second member;
wherein each of the first and second walls of the first member has a uniform wall thickness that is approximately half of the root portion thickness of the second member.

10. The structure of claim 9, in which the first tip portion has a radiused cross-sectional profile.

11. The structure of claim 9, in which the closed end of the receptacle is substantially aligned with the second surface of the base.

12. The structure of claim 9, in which an interface region is formed between the first and second members, the interface region including first and second longitudinal legs spaced by a lateral distance, and in which each of the first and second longitudinal legs has a length that is greater than the lateral distance.

13. The structure of claim 9, in which the second member further includes a second tip portion opposite the first tip portion, the second tip portion having a second tip portion thickness not greater than the root portion thickness of the second member.

14. The structure of claim 13, further comprising a third member with a base defining opposed first and second surfaces, and spaced first and second walls extending outwardly from the second surface of the base to define a second receptacle therebetween, wherein the second tip portion of the second member is sized for insertion into the second receptacle and shaped conformally with the second receptacle so that the second tip portion engages a closed end of the second receptacle.

15. The structure of claim 14, further comprising a second friction stir weld joint that extends through the base and at least portions of the first and second walls of the third member and into the second tip portion of the second member.

16. A structure comprising:
a first member having a base defining an interior surface, and spaced first and second walls extending outwardly from the interior surface of the base of the first member to define a first receptacle;
a second member including an elongate rib having a root portion and first and second tip portions, the root portion having a uniform root portion thickness and each of the first and second tip portions having a tip portion thickness not greater than the root portion thickness;
a third member having a base defining an interior surface, and spaced first and second walls extending outwardly from the interior surface of the base of the third member to define a second receptacle;
the first tip portion being sized for insertion into the first receptacle and shaped conformally with the first receptacle so that the first tip portion engages a closed end of the first receptacle;
the second tip portion being sized for insertion into the second receptacle and shaped conformally with the second receptacle so that the second tip portion engages a closed end of the second receptacle;
a first friction stir weld joint extending through the base and at least portions of the first and second walls of the first member and into the first tip portion of the second member; and
a second friction stir weld joint extending through the base and at least portions of the first and second walls of the third member and into the second tip portion of the second member;
wherein the first and second walls of both the first member and the third member have a uniform wall thickness that is approximately half of the root portion thickness of the second member.

17. The structure of claim 16, in which a first interface region is formed between the first and second members and a second interface region is formed between the second and third members, each of the first and second interface regions including first and second longitudinal legs spaced by a lateral distance and having lengths greater than the lateral distance.

18. The structure of claim 16, in which the each of the first and second tip portions has a radiused cross-sectional profile.

19. The structure of claim 16, in which the base of the first member further defines an exterior surface opposite the interior surface of the base of the first member, and in which the closed end of the first receptacle is substantially aligned with the exterior surface of the base of the first member.

20. The structure of claim 16, in which an interface region is formed between the first and second members, the interface region including first and second longitudinal legs spaced by a lateral distance, and in which each of the first and second longitudinal legs has a length that is greater than the lateral distance.

\* \* \* \* \*